United States Patent [19]

Kim

[11] Patent Number: 5,777,817
[45] Date of Patent: Jul. 7, 1998

[54] VCR TRACKING CONTROL METHOD AND APPARATUS COMPRISING A MICROCOMPUTER FOR GENERATING A CAPSTAN SPEED COMMAND BASED ON A TRACKING ERROR EXPRESSED AS A DIFFERENCE VALUE OF FREGUENCY COMPONENTS OF A PILOT SIGNAL

[75] Inventor: Jeong-tae Kim, Seoul, Rep. of Korea

[73] Assignee: Samsung Electronics Co., Ltd., Kyungki-Do, Rep. of Korea

[21] Appl. No.: 745,624

[22] Filed: Nov. 8, 1996

Related U.S. Application Data

[62] Division of Ser. No. 278,137, Jul. 21, 1994.

[30] Foreign Application Priority Data

Jul. 21, 1993 [KR] Rep. of Korea .................. 93-13793

[51] Int. Cl.⁶ .................. G11B 5/584; G11B 15/52
[52] U.S. Cl. .................. 360/77.14; 360/73.12
[58] Field of Search .................. 360/77.14, 77.06, 360/73.12, 73.01, 73.08, 77.13

[56] References Cited

U.S. PATENT DOCUMENTS

| | | | |
|---|---|---|---|
| 3,663,764 | 5/1972 | Trost et al. | 360/70 |
| 4,777,543 | 10/1988 | Nishijima et al. | 360/70 |
| 4,794,472 | 12/1988 | Doyama | 360/77.16 |
| 5,126,851 | 6/1992 | Yoshimura et al. | 360/72.1 |
| 5,231,550 | 7/1993 | Hashimoto | 360/77.08 |
| 5,251,079 | 10/1993 | Yamada et al. | 360/77.14 |
| 5,510,938 | 4/1996 | Sakakibara et al. | 360/77.14 |

Primary Examiner—Aristotelis M. Psitos
Assistant Examiner—Regine Y. Neal
Attorney, Agent, or Firm—Sughrue, Mion, Zinn, Macpeak & Seas, PLLC

[57] ABSTRACT

A tracking control method and apparatus of an image recorder/reproducer enable high performance tracking control by generating a capstan motor speed control value using a variable capstan speed command onto which a tracking error control is reflected. The method includes the steps of obtaining a tracking control value by performing a predetermined gain control on a tracking error; generating a variable capstan speed command onto which the tracking control value is reflected; determining the speed error of a capstan motor by comparing the capstan speed command and the actual rotating speed of a capstan motor; and obtaining a speed control value of a capstan motor onto which a tracking error is reflected, by performing a predetermined gain control on the speed error. The apparatus includes a tracking controller for outputting a variable capstan speed command onto which a tracking error is reflected; and a capstan speed controller for outputting a capstan speed control signal from the speed error obtained by comparing the actual capstan speed and the capstan speed command. Thus, control adaptability and tracking compatibility are enhanced, and coefficient control and system design can be performed easily.

4 Claims, 5 Drawing Sheets

VCR TRACKING CONTROL METHOD AND APPARATUS COMPRISING A MICROCOMPUTER FOR GENERATING A CAPSTAN SPEED COMMAND BASED ON A TRACKING ERROR EXPRESSED AS A DIFFERENCE VALUE OF FREGUENCY COMPONENTS OF A PILOT SIGNAL

This is a divisional of application Ser. No. 08/278,137 filed Jul. 21, 1994.

BACKGROUND OF THE INVENTION

The present invention relates to a tracking control method and apparatus therefor which realizes proper tracking by controlling a capstan motor speed by employing a variable capstan speed command based on a tracking error, when using an image recorder/reproducer.

In image recorders/reproducers such as a video cassette recorder (VCR) or a video camera, the quality of an image is degraded (for example, video noise is generated on a screen) when tracking is not properly performed. Therefore, tracking control is essential in order to reproduce a high quality screen image. Here, the tracking control device controls a reproduction head in order to obtain the maximum signal is output, by causing the head to correctly scan a predetermined track during reproduction.

An additional control signal is employed for tracking control. For example, in a VCR system employing a VHS format, tracking control is performed by using a control signal recorded on the control track of a tape. In an 8 mm VCR system, pilot signals having four frequency components are respectively recorded on a tape as an automatic track finding (ATF) signal. The recorded pilot signals are utilized for detecting a tracking error, i.e., the degree in which a head deviates from the track to be scanned, during reproduction. Then, a tracking control operation is performed so as to reduce the detected tracking error. At this time, the detected tracking error is minimized by controlling the rotating speed of the capstan motor.

Hereinafter, in order to better understand the present invention, a conventional tracking control method is explained with reference to the attached drawings.

FIGS. 1A and 1B illustrate an instance of a head scan tracing and a tracking error, respectively, in a conventional VCR. Here, an error in the positive direction indicates the head being located over the subsequent track of the track to be scanned, while a error in the negative direction indicates the head being located over the preceding track of the track to be scanned.

The basic principle of tracking control is as follows. Referring to FIGS. 1A and 1B, if the head is located at P1 corresponding to the track following the predetermined track PO, a capstan motor slows down so as to decelerate the tape. If the head is located at P2 corresponding to the track preceding the predetermined track PO, a capstan motor speeds up so as to accelerate the tape. Thus, the head correctly scans the predetermined track. This basic principle is applicable to the present invention as well as the conventional method.

In the conventional method, a capstan servo system for tracking control is shown in FIG. 2.

Referring to FIG. 2, a speed control signal for driving the capstan motor 20 is applied to a capstan motor driver 18, which is obtained by adder 16 summing a tracking control value output by tracking controller 12 and a capstan speed control value output by a capstan speed controller 14.

Here, the capstan speed control value is obtained as follows. Assuming a predetermined normal track, a capstan speed command, which corresponds to a capstan motor's predetermined rotating speed required for the head to correctly run along the normal track, is set as a reference value. Then, a capstan speed error is obtained by comparing the reference value and the actual rotating speed of capstan motor 20. Then, the capstan speed error is converted into a capstan speed control value in capstan speed controller 14, which is obtained independent of a tracking control value for compensating a tracking error.

In addition, the tracking control output is generated as follows. A control pulse is recorded on the control track synchronized with the track starting positions, and is reproduced by a control head (not shown). Then, the phase of the reproduced control pulse is compared with that of a head switching pulse having a predetermined frequency, resulting in a capstan tracking error signal being produced. Then, tracking controller 12 outputs a capstan tracking control value, by amplifying the capstan tracking error signal by a predetermined gain factor, or by differentiating or integrating the capstan tracking error signal.

Adder 16 sums the capstan speed control value output from the capstan speed controller 14 and the capstan tracking control value output from the tracking controller 12, and outputs the resultant sum to capstan motor driver 18 which drives capstan motor 20.

However, in the conventional method described above, various problems tend to arise when the speed control direction for a capstan motor is different from the direction of its tracking control, which will be explained with reference to FIG. 3.

FIG. 3 illustrates a tracking scenario in which a head runs on a track that is greatly altered with respect to a normal track. Here, the scanning tracing of the head, as controlled by capstan speed controller 14, is along a predetermined normal track (direction A), while the scanning tracing of the head, as controlled by tracking controller 12, is run along a modified track (direction B).

Accordingly, if the speed control direction of capstan motor 20 and the direction for controlling its tracking are different, the speed control of capstan motor 20 hinders the efforts to achieve proper tracking, despite attempts to move capstan motor 20 in a direction for reducing the tracking error. Thus, correct tracking is difficult to realize.

To solve the problem, precise gain control for each control value of the above two directions is needed. For this purpose, the respective gains of tracking controller 12 and capstan speed controller 14 need to be precisely controlled. However, such gain control is very difficult to achieve and designing the necessary means for gain control is difficult. Although, even if such gain control means is provided, compatibility is low if the recorder and reproducer are different.

A slight deterioration in the performance of the tracking controller is irrelevant in the case of a VHS or 8 mm VCR, since the track width for such formats is quite large (58 μm for a VHS VCR and 21 μm for an 8 mm VCR). However, for the case of a digital VCR which requires high density recording, high performance tracking is needed as the track width is reduced to 10 μm and narrower. Furthermore, system performance suffers greatly without an improved tracking performance.

SUMMARY OF THE INVENTION

Accordingly, it is an object of the present invention to provide a method and apparatus for performing tracking control by employing a variable capstan speed command which takes into account a tracking control value obtained from a tracking error, as a reference value for obtaining a capstan motor speed control value. This is in lieu of employing a conventional capstan speed command which does not take into account a tracking error.

To accomplish the above object, there is provided a tracking control method of an image recorder/reproducer for converting a tracking error signal into a capstan speed control value and reflecting the result onto a capstan motor drive signal, the method comprising the steps of: calculating a tracking control value for performing a predetermined gain control on the tracking error and converting the gain-controlled tracking error into a tracking control value; generating a capstan speed command for generating a variable capstan speed command based on the tracking control value; determining a speed error by comparing the capstan speed command and the actual rotating speed of a capstan motor; and calculating a speed control value by performing a predetermined gain control on the speed error, thus obtaining a speed control value of a capstan motor based on a tracking error.

There is also provided a tracking control apparatus of an image recorder/reproducer for converting a tracking error signal into a capstan speed control value and generating a driving signal of a capstan motor based on the capstan speed control value, the apparatus comprising: a tracking controller for outputting a variable capstan speed command based on a tracking control value obtained by performing a predetermined gain control on the tracking error; and a capstan speed controller for outputting a capstan speed control signal by performing a predetermined gain control on a capstan motor speed error obtained by comparing an actual capstan speed and the capstan speed command.

The present invention is based on the basic principle of tracking control as described above, which is similar to a conventional method. However, a fundamental difference between them is that the conventional method obtains a capstan speed control value independently of a tracking control value, while the capstan speed control value of the present invention depends on a tracking error (or tracking control value) since the tracking error is reflected in the capstan speed control value.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

The present invention is explained in more detail, as follows, with reference to the attached drawings.

First, a tracking control value is calculated by means of multiplying a predetermined gain, or by differentiating or integrating a tracking error signal. In other words, a proportional integration-differentiation (PID) control is performed. Here, the tracking error can have various physical expressions. That is, the physical expression of the tracking signal depends on the characteristics of the detailed processing means for obtaining a tracking control value from the tracking error. For example, in a system where a head switching pulse having a predetermined frequency is employed as a reference signal, and a tracking error signal is generated by comparing the phase of the reference signal with that of a control pulse recorded on a tape and read with a head, the tracking error can be expressed by a phase difference signal. The tracking error can also be expressed by a frequency difference when four pilot signals, having four different frequencies, are utilized.

Next, a capstan speed command is generated. The capstan speed command process generates a comparison reference value, which is needed for obtaining the speed error of a capstan motor, i.e., a capstan speed command is generated. Specifically, the capstan speed command is based on a tracking control value. Such a capstan speed command can be obtained by various methods; for example, by summing a tracking control value obtained by performing a gain control operation on both a tracking error signal and a capstan speed command not based on a tracking error. Here, the tracking error is not predetermined, and thus the capstan speed command has variable values.

It should be specifically noted that the step for calculating the tracking control value precedes the step for generating the capstan speed command.

Figure 4:
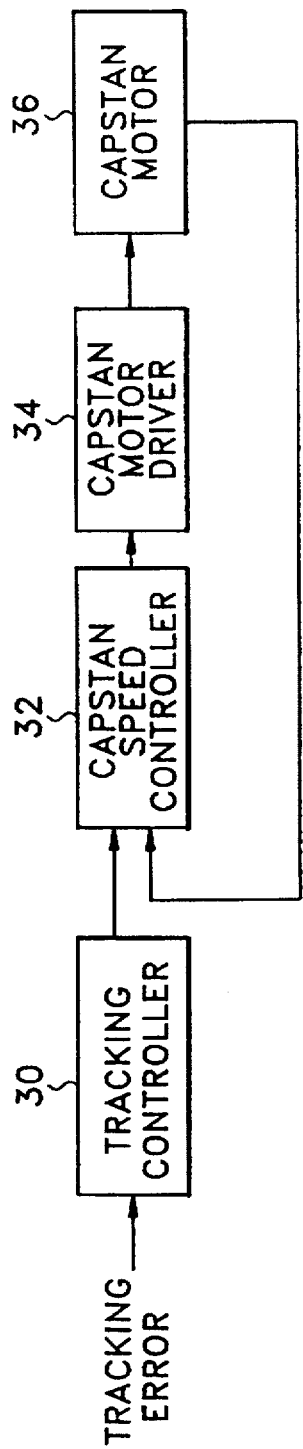
FIG. 4 is a block diagram showing a VCR tracking controller according to the present invention.

FIG. 4 is a block diagram of a VCR tracking controller according to the present invention, in which reference numeral 30 denotes a tracking controller, 32 denotes a capstan speed controller, 34 denotes a capstan motor driver, and 36 denotes a capstan motor. Here, tracking controller 30 directly calculates a tracking control value and generates a capstan speed command.

Figure 2:
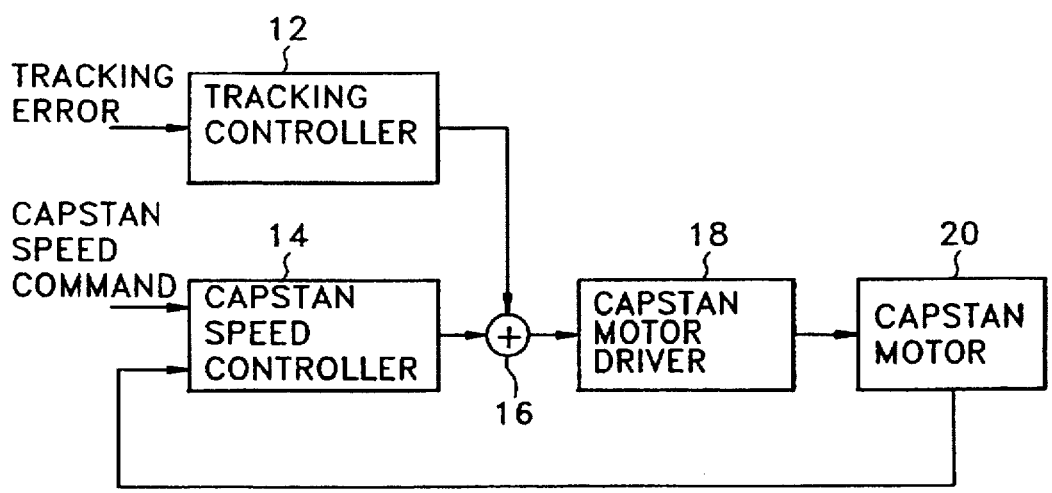
FIG. 2 is a block diagram showing a conventional capstan servo system for tracking control.
Figure 3:
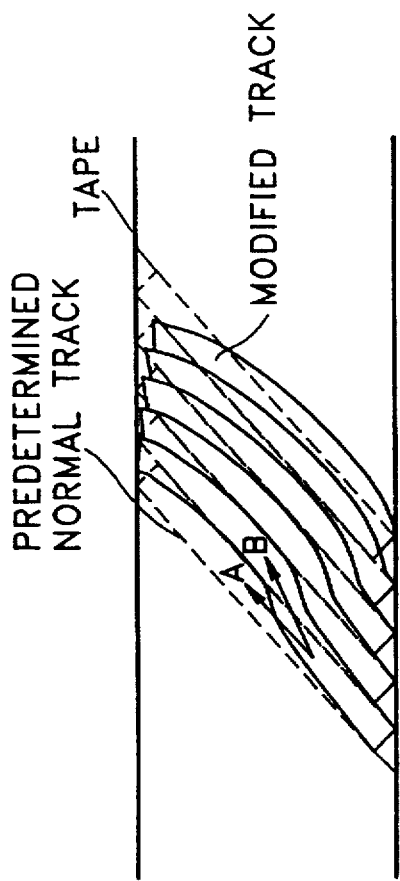
FIG. 3 illustrates a tracking comparison between normal tracks and modified tracks.

Referring to FIG. 4, the capstan speed command output from tracking controller 30 is employed as a comparison reference value in determining a speed error of capstan motor 36, which is similar to the capstan speed command obtained from the conventional tracking controller 12 of FIG. 2. However, the process for obtaining the capstan speed command in the present invention is different from the conventional method, in that it is closely related to a tracking error. That is, the capstan speed command output from the tracking controller 30, shown in FIG. 4, is obtained by setting forth a calculation based on a tracking control value, which is based on the tracking error.

Figure 1A:
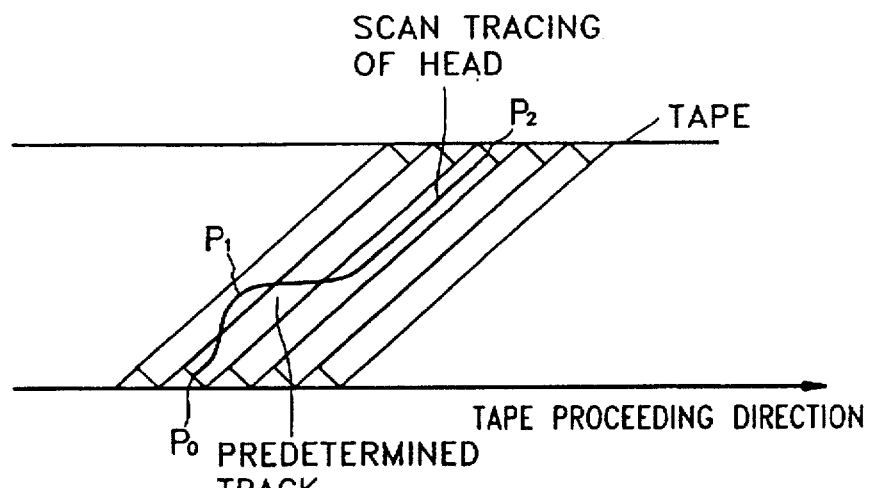
FIGS. 1A and 1B illustrate an instance of scan tracing of a head and a tracking error, respectively, in a conventional VCR.
Figure 1B:
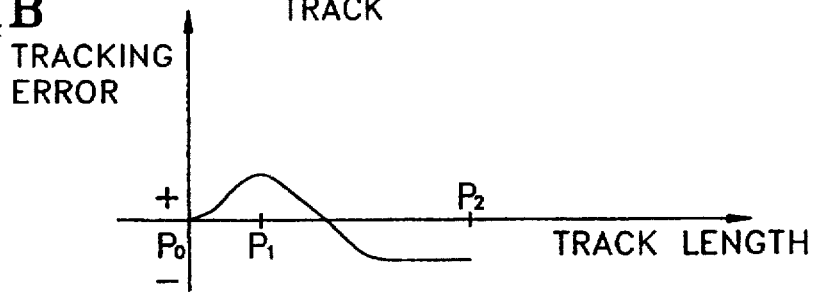

Thus, the capstan speed command obtained from tracking controller 30 is a variable value that includes a tracking control value which depends on the tracking error. This variable value is as obtained follows. When a head is located over the following track (P1 shown in FIGS. 1A and 1B) of the track to be scanned, the tape traveling speed needs to be reduced, and thus the capstan speed command value obtained from the above-described speed command generating step changes so as to slow-down the capstan motor. On the other hand, when the head is located over at the preceding track (P2 in FIGS. 1A and 1B) of the track to be scanned, the tape traveling speed needs to be increased, and thus the capstan speed command value changes so as to speed-up the capstan motor.

Here, the physical expression of the above tracking control value and capstan speed command can be expressed in various forms depending on the detailed processing means. For example, the rotating speed of a capstan motor is generally expressed in terms of a pulse frequency, output from a frequency generator (not shown) attached to the capstan motor. Therefore, for convenience, a capstan speed command is also expressed in terms of a pulse frequency, that is, the value of the capstan speed command corresponds to the pulse frequency.

Now, the process for determining a speed error is explained.

The capstan motor speed error obtained in the speed error determining process is a value obtained by comparing the capstan speed command and the actual rotating speed of a capstan motor. Assuming the capstan speed command as a reference value, the difference between the reference value and the actual rotating speed is the capstan motor speed error. Accordingly, the speed error obtained in the speed error determining process is not based on a tracking error, so that the process of adding a tracking control value to the speed error, which is employed in the conventional method, is unnecessary in the present invention.

The speed control value calculation is now explained.

The process for calculating the speed control value is a type of pre-process, that is, it is a process for obtaining the capstan motor speed control value which reflects the error obtained in the speed error determining process onto the capstan motor rotating speed most stably, accurately and quickly. The speed control value is utilized as a source signal for obtaining a capstan motor driving signal by employing a capstan motor driver.

Capstan speed controller 32 (FIG. 4) both determines the speed error and calculates the speed control value.

Hereinafter, embodiments of the apparatus according to the present invention are explained with reference to the attached drawings.

Figure 5:
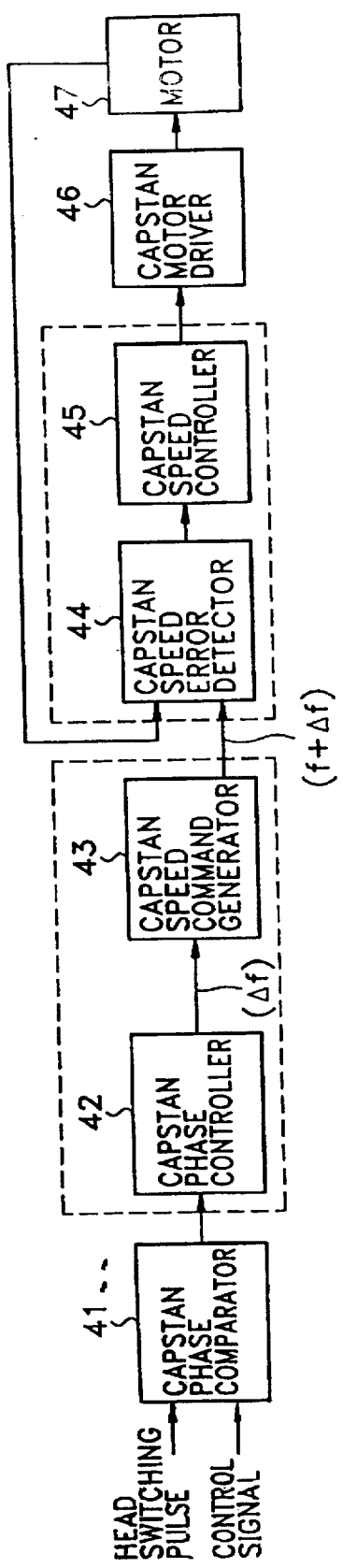
FIG. 5 is a block diagram showing one embodiment of the VCR tracking controller according to the present invention.

FIG. 5 is a block diagram showing one embodiment of an apparatus for performing the method of the present invention. This embodiment is for VCRs employing the VHS method. Here, reference numeral 41 denotes a capstan phase comparator, 42 denotes a capstan phase controller, 43 denotes a capstan speed command generator, 44 denotes a capstan speed error detector, 45 denotes a capstan speed controller, 46 denotes a capstan motor driver, and 47 denotes a capstan motor.

Figure 8:
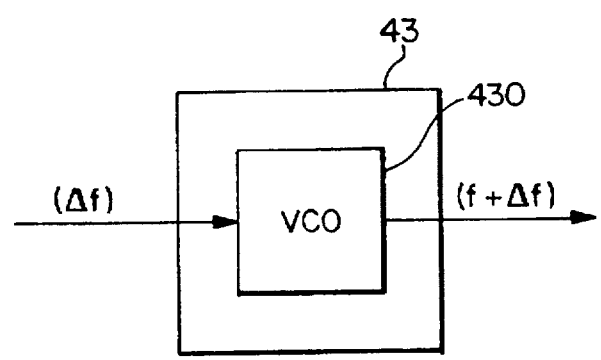
FIG. 8 is a block diagram of an embodiment of a capstan speed command generator.

In the operation of the apparatus of FIG. 5, capstan phase comparator 41 compares the phase of a head switching pulse having a predetermined frequency with that of a control pulse reproduced via a fixed head (not shown) and generates a tracking error. Capstan phase controller 42 multiplies the tracking error by a predetermined gain coefficient, or performs a differentiation or integration operation on the tracking error, and outputs a tracking control value. Capstan speed command generator 43 outputs a variable capstan speed command that corresponds to the pulse frequency relevant to the degree of the tracking control value. (Here, capstan phase controller 42 and capstan speed command generator 43 correspond to tracking controller 30 of FIG. 4.) If the tracking control value output from capstan phase controller 42 is a voltage corresponding to the tracking error, capstan speed command generator 43 can be implemented by a voltage-controlled oscillator (VCO) 430, as shown in FIG. 8. Meanwhile, capstan speed error detector 44 determines and outputs a capstan motor speed error by comparing the actual capstan rotating speed with the capstan speed command provided from capstan speed command generator 43. Capstan speed controller 45 multiplies the capstan motor speed error by a predetermined gain coefficient or performs a predetermined gain control operation, such as differentiation or integration, and outputs a capstan speed control signal to the capstan motor driver 46 which drives the capstan motor 47 according to the capstan speed control signal. (Here, capstan speed error detector 44 and capstan speed controller 45 correspond to capstan speed controller 32 of FIG. 4.)

Tracking controller 30 and capstan speed controller 32 may be implemented via hardware to perform the above functions. However, the apparatus according to the present invention also encompasses a microcomputer having software for performing the same function.

Figure 6:
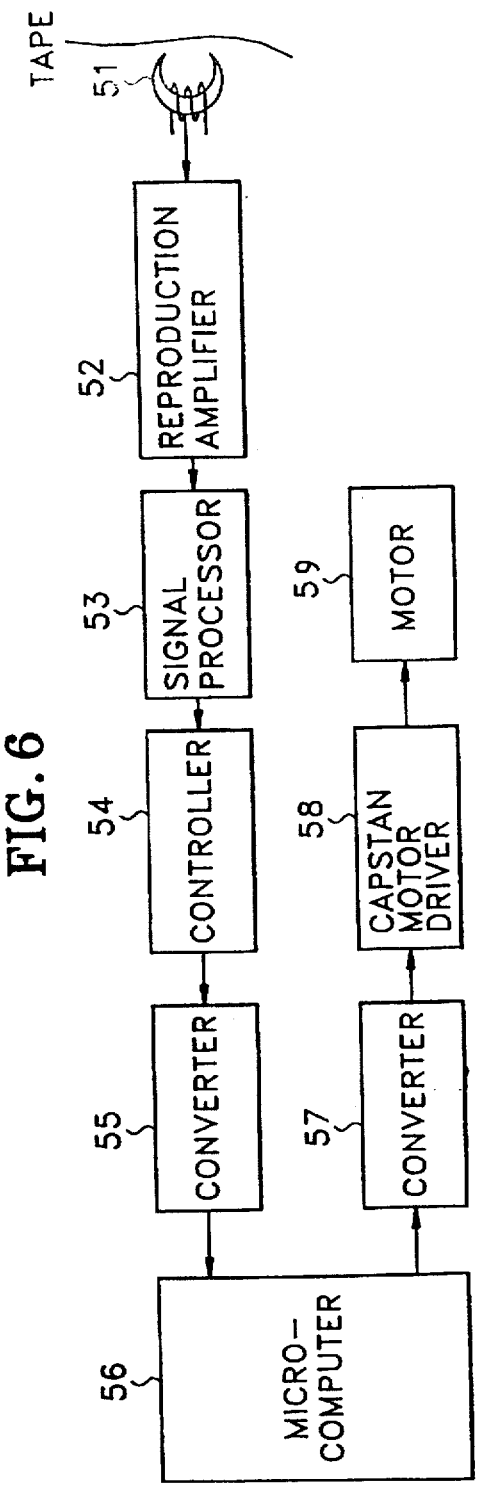
FIG. 6 is a block diagram showing another embodiment of the VCR tracking controller according to the present invention.

FIG. 6 is a block diagram of another embodiment of the tracking controller according to the present invention. This embodiment is for an 8 mm VCR. Here, reference numeral 51 denotes a reproduction head, 52 denotes a reproduction amplifier, 53 denotes a signal processor, 54 denotes an ATF controller, 55 denotes an analog-to-digital (A/D) converter, 56 denotes a microcomputer, 57 denotes a digital-to-analog (D/A) converter, 58 denotes a capstan motor driver, and 59 denotes a capstan motor.

The operation of FIG. 6 is now explained.

As in a conventional 8 mm VCR, the signal on a tape is picked up by reproduction head 51 and amplified by reproduction amplifier 52. Then, signal processor 53 detects the video/audio signal and the pilot signal for discriminating tracks from the amplified signal, and performs signal processing thereon. ATF controller 54 detects the ATF error based on the pilot signal output from signal processor 53. A/D converter 55 converts the detected ATF error into a digital signal and outputs it to microcomputer 56.

Here, the specific frequency components of the four pilot signals are 102.544 KHz (f1), 118.951 KHz (f2), 165.21 KHz (f3) and 148.689 KHz (f4). A difference value based on the respective frequency components of the pilot output is utilized as a tracking error signal. That is, the following expressions are satisfied so as to obtain a tracking error signal, and it is thus determined to what degree a head deviates from a track depending on the type of detected frequency component.

$$|f1-f2|=|f3-f4|=\Delta fA=fH$$

$$|f1-f4|=|f2-f3|=\Delta fB=3fH$$

Microcomputer 56 obtains the tracking control value $\Delta f$ by performing a predetermined gain control on the ATF error signal (tracking error signal), which is added to or subtracted from the capstan speed command in which a tracking error is not considered, i.e., the fixed capstan command value f, thereby converting the tracking control value into speed command f±$\Delta f$.

As a result, the variable capstan speed command f±$\Delta f$ is generated and converted into an analog signal in D/A converter 57. Capstan motor driver 58 controls the actual speed of capstan motor 59 in accordance with the speed command. Thus, the actual speed of capstan motor 59 varies so that tracking is accurately performed.

In the case of an 8 mm VCR, the speed control is performed so that a capstan motor can rotate at a predetermined speed. Thus, the tracking control value is added to the speed control value, and thereby drives a capstan motor accordingly.

Figure 7:
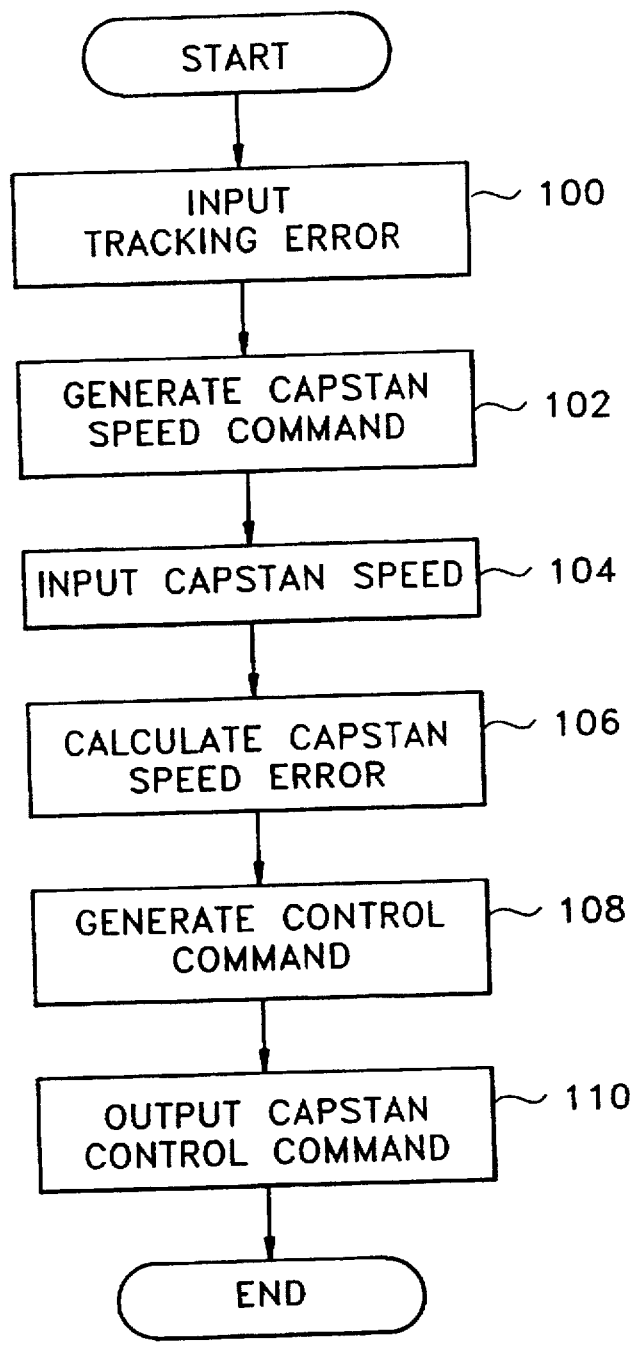
FIG. 7 is a flowchart of a VCR tracking control method according to the present invention.

FIG. 7 is a flowchart illustrating the method of the present invention, and which shows a procedure for calculating the capstan motor speed control value required when tracking control is performed by employing microcomputer 52.

In step 100, the microcomputer reads a tracking error. Then, a tracking control value is determined by performing a proportional integration-differentiation (PID) control algorithm on an input tracking error. The tracking control value is added to the capstan speed command required to drive the capstan motor at the rotating speed that corresponds to the situation where there is no tracking control value and tracking error. Thus, step 102 is performed for generating a new capstan speed command.

Then, the actual rotating speed of the capstan motor is input (step 104), and the difference between the actual rotating speed and the capstan speed command obtained in step 102, for example, a pulse clocking frequency difference, is calculated so as to obtain a speed error (step 106). A capstan speed control signal is obtained by performing a PID control algorithm on the input speed error (step 108), and the capstan speed control signal is output to a capstan motor driver (step 110). The steps 100 to 110, are cyclically repeated.

When tracking control is performed as described above, control adaptability is considerably increased as compared with the conventional method. Therefore, good tracking compatibility is obtainable for the situations where different recording and reproducing apparatus are employed. Also, even when a track is sharply curved (poor track linearity), accurate tracking is possible. Further, since the control signal is processed in order, coefficient control and system design can be easily performed.

What is claimed is:

1. A tracking control apparatus in an 8 mm image device that includes a capstan motor and capstan driving means for controlling the motion of recording media, said apparatus comprising:

detecting means for detecting a pilot signal and discriminating tracks recorded on said media;

automatic track finding control means for outputting an automatic track finding error signal determined by a difference value based on frequency components of said detected pilot signal, as a tracking error signal;

means for generating a variable capstan speed command from the tracking control value obtained by performing a predetermined gain control operation on said tracking error signal;

means for performing a predetermined gain control operation on the capstan motor speed error obtained by comparing an actual capstan speed and said capstan speed command; and means for outputting a capstan speed control signal to said capstan driving means.

2. A tracking control apparatus as claimed in claim 1, wherein said means for generating a variable capstan speed command, said means for performing a predetermined gain control operation, and means for outputting a capstan speed control signal are a microcomputer.

3. A tracking control method of an image recorder/reproducer for converting a tracking error signal into a capstan speed control value and generating a capstan motor drive signal based on said capstan speed control value, said method comprising the steps of:

calculating a tracking control value by performing a predetermined gain control on said tracking error and converting said gain-controlled tracking error into a tracking control value;

generating a capstan speed command for generating a variable capstan speed command based on said tracking control value;

determining a speed error by comparing said capstan speed command and the actual rotating speed of a capstan motor; and calculating a speed control value by performing a predetermined gain control on said speed error, wherein said tracking error is expressed as a difference value established by frequency components of a pilot signal.

4. A tracking control apparatus of an image recorder/reproducer for converting a tracking error signal into a capstan speed control value and generating a driving signal of a capstan motor based on said capstan speed control value, said apparatus comprising:

a tracking controller for outputting a variable capstan speed command based on a tracking control value obtained by performing a predetermined gain control on said tracking error signal; and a capstan speed controller for outputting a capstan speed control signal by performing a predetermined gain control on a capstan motor speed error obtained by comparing an actual capstan speed and the capstan speed command, wherein said tracking controller and capstan speed controller are included in a microcomputer for controlling the functions of said image recorder/reproducer.

* * * * *